(12) United States Patent
Douglas et al.

(10) Patent No.: US 8,747,549 B1
(45) Date of Patent: Jun. 10, 2014

(54) FLY ASH-BASED CEMENTITIOUS MIXTURE

(71) Applicants: Kyle Scott Douglas, Palo Alto, CA (US); Dustin Marion Hulbert, Concord, CA (US); Amitabha Kumar, Fremont, CA (US); Thomas McClure Pounds, Monte Sereno, CA (US); Julie Robyn Rapoport, Mountain View, CA (US); Michael Alexander Telischak, Shorewood, WI (US); Susanne Rebecca Williams, Newark, CA (US)

(72) Inventors: Kyle Scott Douglas, Palo Alto, CA (US); Dustin Marion Hulbert, Concord, CA (US); Amitabha Kumar, Fremont, CA (US); Thomas McClure Pounds, Monte Sereno, CA (US); Julie Robyn Rapoport, Mountain View, CA (US); Michael Alexander Telischak, Shorewood, WI (US); Susanne Rebecca Williams, Newark, CA (US)

(73) Assignee: Calstar Products, Inc., Newark, CA (US)

(*) Notice: Subject to any disclaimer, the term of this patent is extended or adjusted under 35 U.S.C. 154(b) by 0 days.

(21) Appl. No.: 14/087,809

(22) Filed: Nov. 22, 2013

Related U.S. Application Data

(62) Division of application No. 13/914,758, filed on Jun. 11, 2013, now Pat. No. 8,617,438, which is a division of application No. 13/173,794, filed on Jun. 30, 2011, now Pat. No. 8,617,308.

(60) Provisional application No. 61/360,919, filed on Jul. 1, 2010.

(51) Int. Cl.
| | | |
|---|---|---|
| *C04B 24/06* | (2006.01) | |
| *C04B 22/00* | (2006.01) | |
| *C04B 14/36* | (2006.01) | |
| *C04B 18/08* | (2006.01) | |
| *C04B 14/32* | (2006.01) | |
| *C04B 103/00* | (2006.01) | |
| *C04B 103/60* | (2006.01) | |
| *C04B 111/21* | (2006.01) | |
| *C04B 111/20* | (2006.01) | |

(52) U.S. Cl.
CPC ............... *C04B 24/06* (2013.01); *C04B 14/36* (2013.01); *C04B 14/321* (2013.01); *C04B 18/081* (2013.01); *C04B 2103/0021* (2013.01); *C04B 2103/60* (2013.01); *C04B 2111/21* (2013.01); *C04B 2111/29* (2013.01)
USPC ........................... 106/708; 106/705; 106/706

(58) Field of Classification Search
CPC ...... C04B 24/06; C04B 14/36; C04B 14/321; C04B 18/08; C04B 18/081; C04B 2103/0021; C04B 2103/60; C04B 2111/21; C04B 2111/29
USPC ........................................ 106/705, 706, 708
See application file for complete search history.

(56) References Cited

U.S. PATENT DOCUMENTS

| | | | |
|---|---|---|---|
| 4,780,144 A | 10/1988 | Loggers | |
| 5,383,521 A | 1/1995 | Onan et al. | |
| 7,264,673 B2 | 9/2007 | Kayali et al. | |
| 7,344,592 B2 | 3/2008 | Setliff et al. | |
| 7,670,427 B2* | 3/2010 | Perez-Pena et al. | 106/727 |
| 7,794,537 B2 | 9/2010 | Barlet-Gouedard et al. | |
| 7,892,473 B2 | 2/2011 | Aylward | |
| 7,892,479 B2 | 2/2011 | Kayali et al. | |
| 7,998,268 B2 | 8/2011 | Liu | |
| 8,069,633 B2* | 12/2011 | Tonyan et al. | 52/745.13 |
| 8,257,486 B2 | 9/2012 | Nayak et al. | |
| 8,366,823 B2* | 2/2013 | Perez-Pena | 106/705 |
| 8,617,308 B1* | 12/2013 | Douglas et al. | 106/708 |
| 8,617,438 B1* | 12/2013 | Douglas et al. | 264/69 |
| 2003/0127026 A1 | 7/2003 | Anderson et al. | |
| 2007/0169669 A1 | 7/2007 | Costa et al. | |
| 2008/0028994 A1 | 2/2008 | Barlet-Gouedard et al. | |
| 2012/0298011 A1 | 11/2012 | Silva et al. | |
| 2013/0139728 A1 | 6/2013 | Perez-Pena | |

FOREIGN PATENT DOCUMENTS

WO WO2010/074811 A1 7/2010

* cited by examiner

*Primary Examiner* — Anthony J Green
(74) *Attorney, Agent, or Firm* — Finnegan, Henderson, Farabow, Garrett & Dunner, LLP

(57) ABSTRACT

A cementitious mixture for high-volume production of masonry products comprises a hydraulic binder accounting for 20 wt % or more of the cementitious mixture, the hydraulic binder comprising 75 to 100 wt % Class C fly ash with a CaO equivalent content of at least 15% by weight. The cementitious mixture also comprises one or more aggregates, and a set control system.

14 Claims, 7 Drawing Sheets

FLY ASH-BASED CEMENTITIOUS MIXTURE

RELATED APPLICATIONS

This is a divisional of U.S. patent application Ser. No. 13/914,758, filed on Jun. 11, 2013, now U.S. Pat. No. 8,617, 438 B1, which is a divisional of U.S. patent application Ser. No. 13/173,794, filed on Jun. 30, 2011, now U.S. Pat. No. 8,617,308 B1, claims the benefit of priority from U.S. Provisional Patent Application No. 61/360,919, filed Jul. 1, 2010. All of the above-referenced applications are expressly incorporated herein by reference.

FIELD OF THE INVENTION

The present invention relates to cementitious compositions and processes for making masonry and other building products, using Class C fly ash, a coal combustion by-product, as a binder component.

BACKGROUND OF THE INVENTION

Factory-formed building products are used in the construction of buildings and other infrastructure. Examples include masonry units made from vitrified or non-vitrified clay such as bricks and roof tiles, and products made from Portland cement, lime, gypsum, and aggregates in the shape of blocks, sheets, bricks, and so forth. Manufacture of factory formed building products usually requires energy and generates greenhouse gases.

In an effort to reduce the total energy and greenhouse-gas footprint from manufacturing, conserve virgin materials, reduce unit cost, and/or improve the technical properties of these products, it has become more common to recycle post-industrial waste or byproducts as partial replacement for certain ingredients. Even with these recycled materials, these products continue to rely to a large degree on traditional energy- and carbon-intensive materials or methods to realize their performance characteristic.

Fly ash is a useful post-industrial by-product used as a partial replacement in cementitious products. The ASTM C618 specification refers to Classes of fly ash, termed Class F fly ash and Class C fly ash, distinguished by the coal from which they originate and the ultimate chemical composition of the ash. The Class F fly ashes may be generally obtained during the burning of anthracite or bituminous coal, and rarely manifest cementitious properties and hardening when mixed with water. Prior art generally relies on the use of fly ash in conjunction with another hydraulic cement (e.g., lime or Portland cement). Class F fly ash can act as a pozzolan in hydraulic cementing systems, a material capable of reacting with lime in the presence of water to form hydraulic setting compounds with cementing properties. Lime may be, for example, added or obtained as an in-situ product of the reaction between Portland cement and water. In the absence of lime, Class F fly ash may be incapable of significant reaction with water. This incapability of Class F fly ash to react with water could be attributed to the low presence of calcium either in the direct oxide or complex oxide form within the fly ash. A calcium component of fly ash may be necessary for creation of reaction products capable of providing cementing properties. On the other hand, Class C fly ash, normally produced from the burning of sub-bituminous or lignite coal, usually demonstrates cementitious properties in addition to pozzolanic properties generally attributed to its higher free lime and calcium compound content, Class C fly ash also may contain relatively larger amounts of calcium, both in direct oxide and complex oxide form, when compared to Class F fly ash. This calcium content may permit Class C fly ash to react with water without need for the presence of additional chemicals, and to generate reaction products capable with cementing properties. Thus, Class C fly ash may be used as a cementing material without added lime or Portland cement.

However, this opportunity of using Class C fly ash as a cementing material capable of reacting with water on its own without using additional cementing compounds has not been thoroughly exploited by current industry. Class C fly is usually obtained as a by-product of coal burning. Class C fly ash obtained this way is dependent on the naturally variable chemical composition of the coal. Utilities, such as power plants that burn sub-bituminous and lignitic coal to produce Class C fly ash, often do not regulate the quality of the ash produced with respect to chemical composition and physical properties. Rather, the ash produced is generally used as an as-is by-product. Such a by-product may be highly variable when compared to specially controlled manufactured products such as Portland cement and lime. These and similar aspects of Class C fly ash have restricted the use of Class C fly ash as the main or sole binder in products made with hydraulic cements.

SUMMARY OF THE INVENTION

Figure 1:
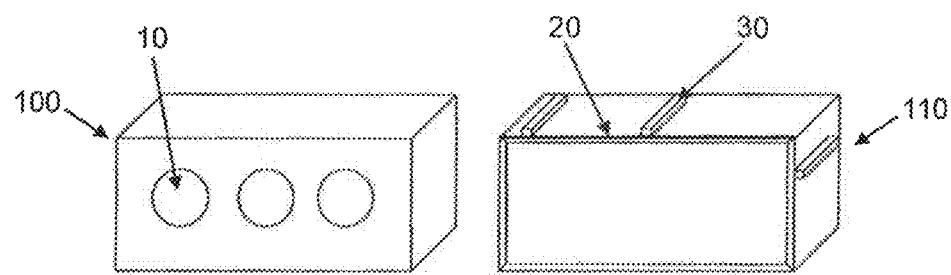
FIG. 1 shows a typical masonry product in the exemplary shapes of bricks and pavers used in construction practices, according to aspects of the present invention.

One of the aspects of the invention is to reduce energy required and greenhouse gases generated in the manufacture of building products or masonry units.

This may be done by using a Class C fly ash as the binder component for masonry units and building products. The Class C fly ash, as defined by ASTM C618 may be obtained as a by-product of burning sub-bituminous or lignitic coal. The Class C fly ash may, for example, have a CaO equivalent content of at least about 15% by weight and a loss on ignition due to unburned carbon content less than about 3% by weight.

An exemplary embodiment comprises a mixture with a hydratable cementitious binder including Class C fly ash, in the amount of about 20 to about 90% based on total dry weight of the mixture, and an aggregate portion in the amount of about 10 to about 80% based on total dry weight of the mixture. The mixture may be made into a masonry product after wetting with water, preferably in an amount so as to have essentially zero slump when tested by the standard cone method for measuring slump such as described in ASTM C143 (Standard Test Method for Portland Cement Concrete), and mixing preferably for 5 to 300 seconds in a mechanical mixer, and formed into an object through a process of vibration compaction with low uni-axial compressive pressure, followed by curing in a humid atmosphere for, preferably, for 4 to 20 hours. Preferred exemplary embodiments of the process may permit high volume manufacturing in industrial units with throughputs in excess of 6 tons per hour and with high output efficiency of saleable product.

Exemplary embodiments of the invention further comprise a set control system comprising a mixture of substantially 1 part boron by weight obtained from, for example, a boron containing salt or acid and substantially 3 to 27 parts of tartaric acid by weight, preferably in the amount between 0.04 and 5% by weight of the cementitious mixture. The set control system may permit the cementitious mixture to remain in a dormant state for at least 10 minutes after mixing the cementitious mixture with water, as evidenced by, for example, a change in temperature of the cementitious mixture due to reaction between the Class C fly ash and water. Further, the set control system may also permit the Class C fly ash in the cementitious mixture to initiate reaction with water within a period of 240 minutes of mixing with water as evidenced by a change in temperature of the cementitious mixture due to reaction between the Class C fly ash and water. Given variability in reactivity of fly ash available from power plants, establishing a minimum dormant state may not be sufficient for high-volume manufacturing and there may be need to ensure a maximum limit on this dormant state. This set control system may allow a composition to be tailored to provide acceptable dormancy times given for a particular source of fly ash, thus avoiding the need to constantly tune the set-control dose to match the variation in ash reactivity.

Still further exemplary embodiments may be directed to meet performance standards for concrete and clay building materials and architectural elements, including, but not limited to, compressive strength, freeze-thaw durability, and efflorescence resistance. Aspects of the invention include compositions that provide products capable of maintaining structural integrity over multiple freeze-thaw cycles without substantial addition of air entraining agents typically used to entrain air so as to enable freeze-thaw durability in cementitious materials. Additional exemplary embodiments of the cementitious mixture may include water repelling agents to, for example, act as efflorescence control agents, thereby decreasing white salt deposits substantially (e.g., deposits of sulfate salts of sodium, potassium and calcium). Some exemplary embodiments may withstand compressive load equal to or in excess of 20.7 MPa and even more preferably, greater than 55.2 MPa to, for example, permit applications as building bricks and pavers. Certain other exemplary embodiments include coloring agents to, for example, modify the aesthetic appearance of the products made from the exemplary mixture. Exemplary embodiments may permit reduction in manufacturing cost, by, for example, replacing expensive binders with less expensive recycled materials, materials, and thereby eliminating energy-intensive and costly production steps (e.g., firing as in the production of sintered or fired clay products) while maintaining the aesthetic appeal and performance of typical building products.

Further features and advantages of the invention are provided hereinafter.

DETAILED DESCRIPTION OF EXEMPLARY EMBODIMENTS

The terms "masonry unit" and "masonry product" as used herein, shall, interchangeably, refer to an object (e.g., a brick, block, paver, segmented retaining wall block, or other three-dimensional object) made from a hydratable cementitious mixture (e.g., an architectural element, pipe, block, panel or molding), FIG. 1 shows a typical masonry product in exemplary shapes of bricks and pavers used in construction practices.

The term "cementitious composition" is used herein to refer to mixtures including a hydraulic cement or cementitious binder, usually, but not exclusively, a Class C fly ash (as defined by the ASTM C818), and may also include other fly ash, blast furnace slag, silica fume, clay, calcined clay, limestone or other materials commonly included in Portland cement mixtures as supplementary cementing materials or agents, to which water may be added. Further, the term "cementitious composition" is used herein to refer to mixtures that may be composed in some part, of a construction aggregate, defined as generally non-cementitious particles wherein at least 95% of the particles have an average diameter of less than about 3 centimeters. These cementitious compositions may be referred to as "masonry concrete" or "masonry mortar." The cementitious mixtures used to form masonry units may exhibit relatively low fluidity such as in low slump mixtures or of high fluidity as in wet casting, depending, for example, on the need for free standing molded structures or in-mold products subsequently hardened by curing in water laden atmospheres.

Cementitious compositions of exemplary embodiments may be formed by proportioning and mixing particular amounts of certain materials (e.g., a hydratable cementitious binder, construction aggregates, water, and/or one or more admixtures taken from a group of inorganic and organic acids and salts, preferably alkali salts or acids with boron cation and the Dextro (L+) form of tartaric acid, organic water repellent efflorescence control agents and organic acids). Certain combinations in some exemplary embodiments may provide a set control system that substantially controls the timing of the reaction of water and the cementitious components of the mixture.

Exemplary embodiments may be designed to have cementitious mixtures with various slump values to accomplish products with differing characteristics. The slump values may be obtained, for example, from tests described in ASTM C143. The slump test may be performed on the cementitious mixture after, for example, ingredients have been wetted by water and the mixing with water has been completed. The test may be conducted as soon as possible after mixing with the water so as to limit reaction of the hydraulic binder with the water and drying out of the mix. The test may be performed according to procedure described in ASTM Standard C143, using a galvanized steel cone, 30.48 centimeters in height, with a base opening 20.32 centimeters in diameter and the top opening 10.16 centimeters in diameter, with top and bottom openings perpendicular to the vertical axis of the cone and wherein the surfaces mildly dampened with water. The cone also may have two protruding feet towards the base to, for example, permit operators to hold the cone with their feet while standing over the cone. The cone may be placed on a flat, water resistant surface, and filled with cementitious mixture in layers. A straight, steel tamping rod, 1.59 centimeters in diameter and approximately 60.96 centimeters in length with one end rounded to a diameter of 1.59 centimeters may be, for example, used to rod each layer individually with 25 strokes of the tamping rod. Effort is made to permit the rod to just penetrate a layer that has already been consolidated. A top layer is rodded with a heap of concrete above the mold. Upon completion of rodding, the top surface of the cone may be struck off using the tamping rod. The vertical height may be measured from the top of the cone, filled with cementitious mixture to the base of the non-absorptive surface. The cone may be lifted vertically at a rate such that the cone is removed from the entire cementitious mixture in a few seconds. The vertical height of the cementitious mixture from the non-absorptive base may be measured. The difference in height of the cementitious mixture before and after removal of the galvanized cone is generally referred to as "slump." Greater subsidence of the cementitious mass upon removal of the cone may result in larger slump numbers while a measurement of zero slump essentially indicates a rodded mixture capable of maintaining its shape without the support of the galvanized cone.

Some exemplary embodiments with higher slump of about 15 centimeters or more (as measured by the slump test), may be accomplished with higher water contents. Exemplary embodiments with about 25% water by weight of the cementitious mixture may be rather fluid, while certain embodiments that exhibit zero slump may be accomplished with, for example, water amounts of about 5 to 7 wt %. Certain embodiments comprising about 3 wt % water by weight of the cementitious mixture may be relatively dry and disaggregated when mixed.

The amount of Class C fly ash and the amount and size of aggregate also play roles in the fluidity and flow characteristics of the cementitious mixture sometimes necessitating varying the water content within the various exemplary embodiments to meet the needs of the process to achieve the final product in terms of shape, size, material distribution, porosity and/or other attributes that define the product.

An exemplary embodiment comprises a process of providing a cementitious mixture comprised of a post-industrial recycled material, (e.g., Class C fly ash), as component in a hydraulic binder, preferably with at least 15 wt % equivalent calcium oxide content and a carbon content of less than 3 wt % of the total ash, and construction aggregate, as defined above, mixed with water and requisite set control system to substantially zero slump when tested by the standard cone method of ASTM C 143, and vibration compacting the mixture into a masonry unit followed by curing in the presence of water and air, with or without additional heat to raise the temperature above ambient, and hardening the vibration compacted cementitious mixture, in certain exemplary embodiments, the hydraulic binder may comprise a mixture of Class C fly ash and supplementary cementing agents. Supplementary cementing agents may include: Class F fly ash, unclassified fly ash, rice husk ash, silica fume, blast furnace slag, clay, calcined clay, metakaolin, zeolites, metastable inorganic oxides, ground glass, powdered inorganic oxides, and/or gypsum. Supplementary cementing agents may be used in exemplary embodiments of the invention in amounts of up to about 25% by weight of the hydraulic binder. The remainder of at least 75% by weight of the hydraulic binder may be comprised of Class C fly ash. The presence of some of the supplementary agents in embodiments may increase the amount of post-industrial recycled material in the compositions. In certain embodiments, the hydraulic binder may consist of Class C fly ash without supplementary cementing agents.

The amount of hydraulic binder in a cementitious composition may control properties of the composition when hardened with water. In exemplary embodiments, the hydraulic binder may account for about 20% or more of the cementitious mixture. In other exemplary embodiments, the hydraulic binder may account for up to about 90 wt % of the mixture. The amount of Class C fly ash in the cementitious mixture contributes to the amount of post-industrial recycled material in the cementitious mixture. It may be desirable to maximize the amount of post-industrial recycled material in a cementitious mixture to enable maximized reductions in greenhouse gas emissions and embodied energy associated with the compositions of the exemplary embodiments.

In other exemplary embodiments, the environmental impact of building materials may be improved by, among other things, decreasing the amount of energy and emissions required to manufacture the building materials. For example, the embodied energy and greenhouse gas emissions of the compositions, processes, and products described herein, may be decreased by, for example, curing the cementitious mixtures, after wetting with water, during the hardening at temperatures up to 100° C. in the presence of water. It may be preferable not to exceed 100° C. so as to reduce the energy and cost. In certain exemplary embodiments, the curing of the cementitious mixture may include exposure to water at ambient temperatures.

Figure 2:
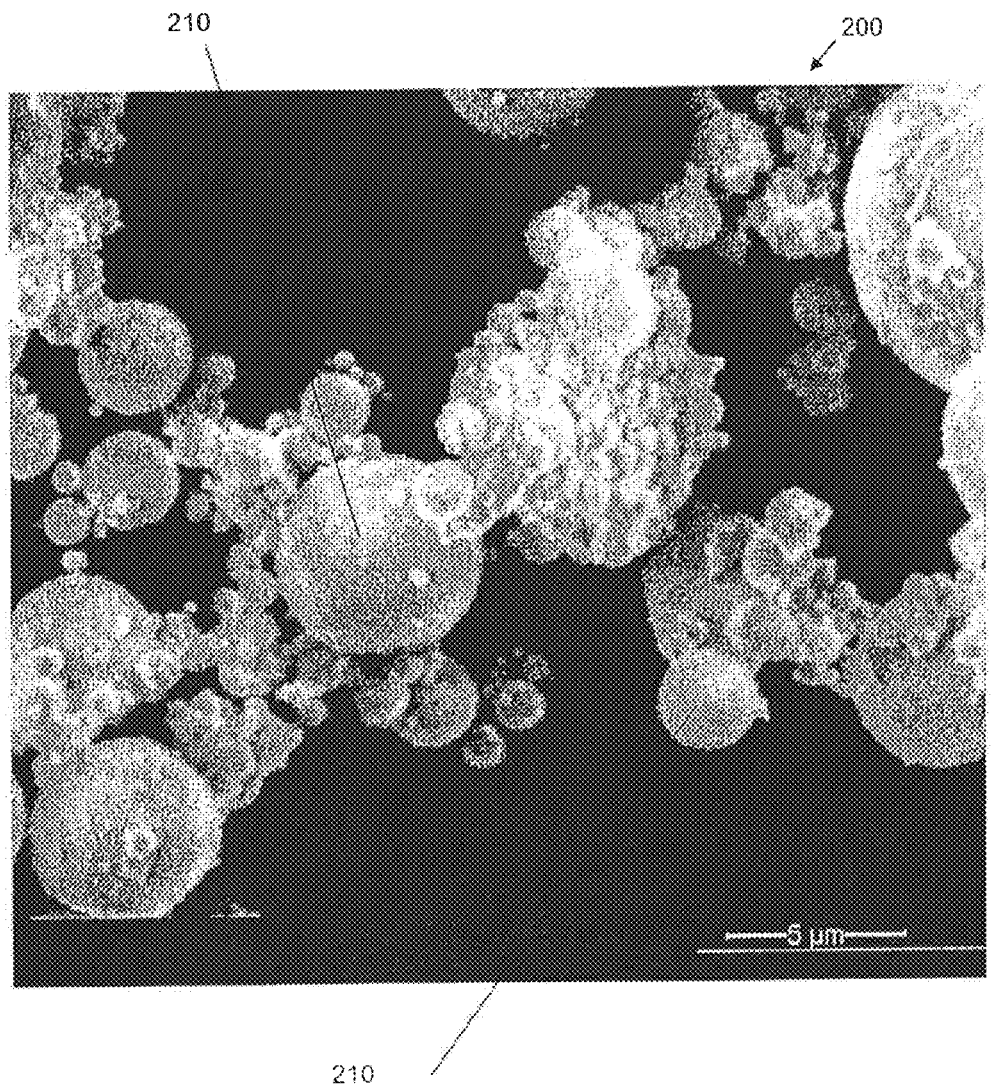
FIG. 2 shows typical particles of Class C fly ash as may be observed with the aid of a scanning electron microscope, according to aspects of the present invention.
Figure 3:
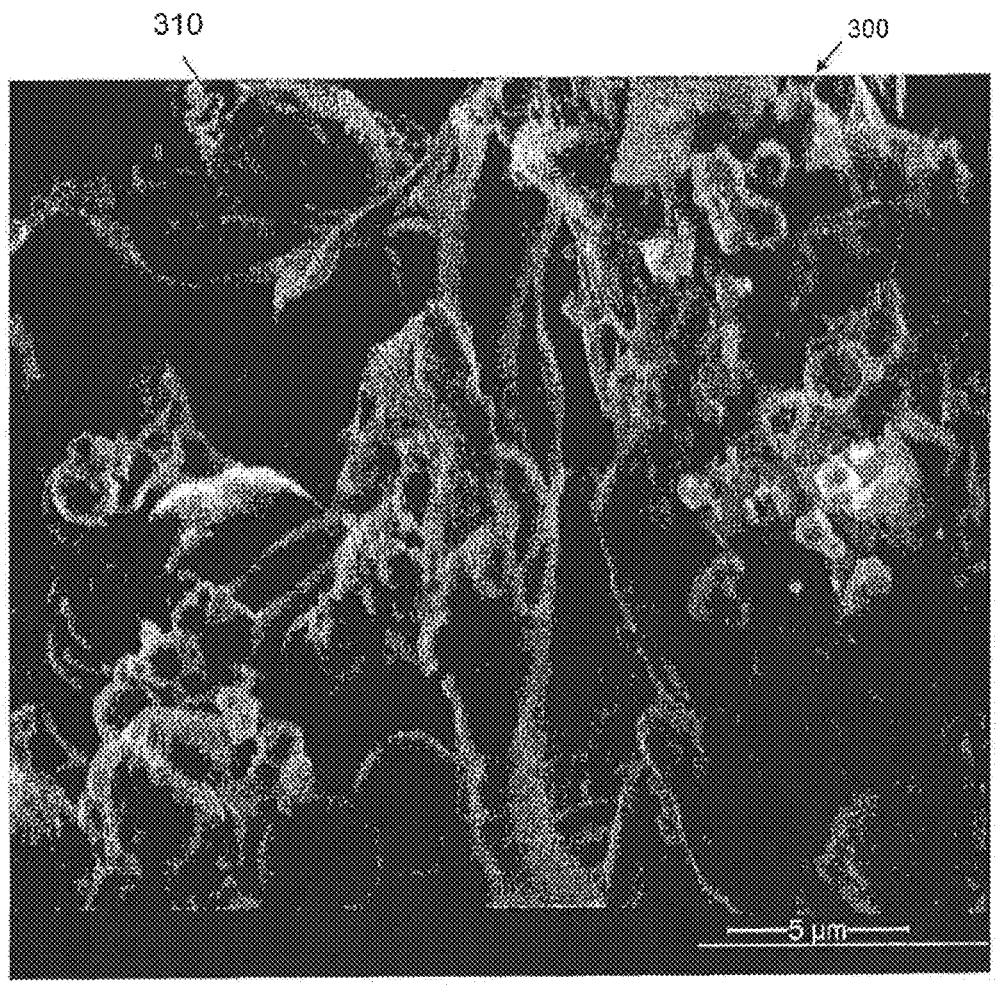
FIG. 3 shows a micrograph of the resulting reaction products of Class C fly ash and water.

A Class C fly ash suitable for use in exemplary embodiments may be obtained from electricity generating thermal power plants, for example. Such power plants may burn, for example, sub-bituminous coal from the Powder River Basin area of the United States of America to provide energy. The micrograph 200 depicted as FIG. 2 shows particles 210 of Class C fly ash observed with the aid of a scanning electron microscope. When such Class C fly ash particles 210 are mixed with water, they may react. The reaction may result in the forming of hydrated materials that joins the loose particles 210 together. This behavior of Class C fly ash after reaction with water may be viewed using a scanning electron microscope. A view of the resulting reaction products 310 of Class C fly ash and water is reproduced in the micrograph 300 of FIG. 3. Various exemplary embodiments described herein may benefit from the ability of the Class C fly ash to react with water to form a hardened mass upon curing. The amount of CaO in the exemplary embodiments may be at least 15 wt % when expressed as an equivalent weight as measured by techniques using X-ray fluorescence with calibrations against standard fly ash materials, for example, obtained from the US National Institute of Standards and Technology.

The source of fly ash and Class C fly ash for embodiments described herein may include any suitable source. For example, Commercial distributors of Class C fly ash may include Boral MTI and Lafarge North America. Thermal power plants (e.g., those run by WE Energies, at Oak Creek and Pleasant Prairie in Wisconsin, USA), may produce Class C fly ash that may be used in various embodiments. Alternatively, it may also be possible to produce Class C fly ash by introducing calcium-rich compounds into a coal stream of a thermal power plant and, thereby, generate a calcium rich fly ash. Class C fly ashes used in various embodiments may also be available, for example, in Turkey and Kosovo, among other places.

In some exemplary embodiments, compositions may be comprised of Class C fly ash described in ASTM C618-08a (ASTM C618-08a *Standard Specification for Coal Fly Ash and Raw or Calcined Natural Pozzolan for Use in Concrete Class C*) and ASTM Class F fly ash, as well as fly ash that does not meet the requirements in ASTM C618. Embodiments of the invention accommodate the variability of by-product Class C fly ash and produce reliable objects at high volume (e.g., about 6 tons of cementitious mixture per hour or more), thus creating a new and useful use of Class C fly ash in its available form. The fly ash may be used as received from a power plant or may be processed prior to use. Processing of the fly ash can include, but is not limited to, changes in chemistry through, for example, addition of organic and inorganic compounds, changes in physical characteristics (e.g., particle size distribution through grinding, sieving, agglomeration, size classification, fluidization, and density separation), changes in physicochemical characteristics (e.g., through processes such as etching with acids or alkalis, temperature annealing, thermal treatments, and pressure treatments). In the manufacture of masonry units, it may be preferable to process the fly ash obtained from thermal power plants as little as possible prior to manufacture of masonry units since such processing often adds to the cost of the material and the energy consumed in the process.

Class C fly ash may be obtained, for example, as a by-product of the burning of sub-bituminous or lignitic coal in thermal power plants during the production of electricity, Class C fly ash obtained from thermal power plants may exhibit reactivity with water. The reactivity of Class C fly ash with water may be described by great variability in terms of a rate at which the Class C fly ash hardens into a monolithic mass when mixed with water. Using this measure, we have observed that certain batches of Class C fly ash may harden into a solid mass in as little as 90 seconds. Other batches of Class C fly ash may harden in more than 60 minutes into a solid mass when mixed with water, We have developed methods to measure the variability of Class C fly ash from batch to batch.

The variability in reactivity of Class C fly ash with water complicates industrial processes using the fly ash. The complications stem from, among other things, the fact that industrial use of Class C fly ash to make products may be accomplished by providing sufficient working time to permit making of sufficient quantities of mixture and having sufficient time to use such mixtures. Most importantly, if Class C fly ash hardens in the presence of water while being processed in machinery, there may be risk of damaging the machinery if solidification of mixture occurs within the machinery. Also, premature and delayed setting may lead to undesirable product performance. Thus, a focus of our effort has been towards the development of a system that handles batch to batch variation in Class C fly ash properties. We have successfully achieved this goal by developing a set control system that is capable of enabling an industrial process to use Class C fly ash relatively in large quantities. This set control system allows Class C fly ashes that react quickly with water to be slowed down to react at least 10 minutes after mixing the Class C fly ash with water. Further, in cases where the as-received Class C fly ash reacts relatively slowly with water, addition of the set control system may allow the Class C fly ash to react with water within a period of 240 minutes or less. Importantly, embodiments described herein allow tailoring of the curing system so that, for example, a predictable dormancy window can be achieved with a substantially constant dose of admixtures that accommodates variation in fly ash reactivity from a particular source. Doing so may substantially obviate the need to continuously or frequently change the dosing to match to the reactivity of specific batches of ash.

Exemplary embodiments comprise a set control system including a mixture of boron containing acid or salt and tartaric acid in Dextro (L+) chiral form. Other embodiments may use set control systems with tartarate salts such as potassium tartarate to supply the tartaric anion, among other things. Embodiments of the invention for an automated industrial process may be suitable at least in the sense that they can be used with variation in composition and properties of, for example, fly ash. Such variation may be desirable to, for example, safe guard against accidental over-or under-release of chemicals. The set control system of embodiments of the invention may effectively control the setting and hardening of Class C fly ash in an automated process without substantial negative impact on the final properties of the product. Particular embodiments use the set control system with 1 part boron by weight obtained from a boron-containing salt or acid and 3 to 27 parts of tartaric acid by weight, preferably in the amount between 0.04 and 5% by weight of the cementitious mixture to control the setting behavior of the mixture.

Certain embodiments that comprise the set control system may result in cementitious products that contain at least 0.0015% by weight boron and at least 0.01 by weight tartaric acid in the form of a salt of tartaric acid.

Exemplary embodiments include cementitious compositions that may be wetted with water and mixed in mechanical mixers in the presence of air. Mechanical mixing may be carried out in batch mode, for example, or in continuous mode or other modes with application of shear forces. Sufficient mixing time for intimate mixing of the components may also be provided. The mixing may be carried out, for example, for short periods of time (e.g., extending to only a few seconds), while in other embodiments the mixture and water may be mixed for longer periods (e.g., 600 seconds). It is to be understood that, while specific compositions, amounts and ratios are discussed herein, they may be altered, for example, according to a batch size. The size of the batch of material being mixed, may dictate, for example, the amounts of various ingredients, the amount of water, the shear forces imparted by the mixer, and the nature of the process direct the time and nature of mixing of ingredients. In certain embodiments, water may be added to the cementitious mixture in stages during the mixing process. In others, water may be added all at once or introduced with ingredients. For example, water may be added with the set control system, aggregates, and integral water repellents. The processes of water addition may be chosen to suit the type of mixtures being made and/or the type of products to be produced. While, for example, exemplary embodiments may use mechanical mixers. Manual means (e.g., using hand mixers) may also be employed.

In exemplary embodiments, the composition has been engineered to enable the use of vibration compaction as a shape forming method of the mixture. Compositions based on Class C fly ash as a binder material may have the ability to produce vibration cast products at relatively high volume with requisite strength, density, and other key performance characteristics without adding substantial amounts of plasticizing chemicals, specially-graded aggregates, or flow-enhancing ingredients.

Relating to masonry concretes and masonry mortars including cementitious compositions with hydratable binders, it may be hydraulic binders composed almost entirely of recycled material sold as Class C fly ash may be incorporated in embodiments of the invention.

Also relating to masonry concretes and masonry mortars involving cementitious compositions with hydraulic binders, especially when used to make vibration compacted masonry products in molds with confining pressures of 345 kPa at maximum from zero slump mixes as measured by the test described in ASTM C143, cementitious mixtures according to the present invention may be used that do not contain chemicals that impart a plasticizing action to enable flow and compaction during vibration. Such plasticizing chemicals may increase difficulty of composing the mixture and add to the energy and material costs of the product. Further, fine grained materials, for example silica fume, may play a role in allowing flow and compaction of cementitious mixtures. Additional materials such as fine grain materials may add cost to the building units due to higher material costs compared to Class C fly ash. According to the present invention, cementitious mixes can be formulated with Class C fly ash based hydraulic binders in the absence of additional extremely fine grained materials such as silica fume.

An exemplary embodiment comprises a cementitious composition with Class C fly ash mixed with 3 to 25% water by weight of the cementitious mixture. Such a mixture may be capable of being formed by vibration compaction into near net shape in molds with the possible application of confining pressure up to 345 kPa. The vibration compaction process may introduce vibratory force ranging from 5 to 88 kN which may be applied at a single frequency or at multiple frequencies (e.g., wherein the applied frequency of the vibration varies over time). For example, the vibratory force may be applied using electro mechanical or other devices that provide the vibratory force at varying frequency. One such electro mechanical device may be, for example, operated using between 0 to 75 Hz frequency alternating current electrical energy through a variable frequency drive. In various embodiments, the vibratory force may be exerted for time periods varying from 1 to 60 seconds, for example, so as to enable compaction and densification. In certain embodiments, the vibration time may be between 1 and 10 seconds. In other embodiments it may be necessary to vibrate for 60 seconds to achieve desired compaction. The cementitious mixture may be impacted by forces of relatively low magnitude at the start of the vibration compaction step. The vibration compaction forces may then increase during vibration compaction, and decrease as the vibration step stops. In certain embodiments, the cementitious mixture may be exposed to a range of vibratory forces, for example, from about 5 to 88 kN. The duration of the application of the forces which may be varied depending, for example, on desired compaction as discussed above.

Exemplary embodiments are comprised of cementitious mixtures that may be removed from the mold soon after completion of vibration compaction and substantially retain the shape of the mold. Time of removal may be, for example, more than 0.1 seconds after completion of vibration compaction. Release of the cementitious mixture from the mold soon after completion of vibration compaction may allow reuse of the mold without excessive waiting for the removal of the molded product. Early release of the molded product from the mold may be made possible due to the composition of the cementitious mixtures of the embodiments, and the process of vibration compaction used to form the molded object.

Exemplary embodiments may be comprised of cementitious mixtures that may be vibration compacted to some fraction of the theoretical density of the ingredients comprising the mixture. Upon applying vibration compaction to a wetted cementitious mixture in the presence of air in a confined mold space, the mixture may compact to the shape of the mold. Some amount of air may be trapped within the molded product. The content of air in such vibration compacted molded products results in density lower than the theoretical density of the solid ingredients and water in the cementitious mixture of the embodiments. Various embodiments of the invention may accommodate for products with densities ranging from 50% to 98% of the theoretical density. Embodiments with lower density may have larger amounts of entrapped air than embodiments with higher density.

The aggregate contents of mixtures to be compacted by vibration may be chosen to provide smooth exterior surfaces minimizing surface blemishes thereby exposing a uniform surface with visual appeal. Construction aggregates suitable for use in exemplary embodiments include but are not limited to: silica sand, limestone, granite, dolerite, basalt, sandstone, dolomite, and quartz, recycled concrete, recycled foundry sand, recycled glass, recycled minerals, and/or mine spoils. In certain embodiments, the aggregates may be mixtures of materials comprising particles ranging in size (e.g., from about one micrometer to about 3 centimeters). Certain embodiments may include cementitious mixtures of aggregate and hydraulic binder in amounts ranging from, for example, 10 parts aggregate to 90 parts hydraulic binder and 80 parts aggregate to 20 parts hydraulic binder. The amount of hydraulic binder in a cementitious mixture of hydraulic binder and aggregate generally influences the nature of the process and the qualities of the final product. Aggregate materials in various embodiments may have a range of different densities. Some aggregates may have, for example, densities lower than that of the hydraulic binder while other aggregates may be of higher density compared to the hydraulic hinder. Exemplary embodiments may use varying ratios of aggregate to hydraulic binder, as described in the range, for example, of 10 parts aggregate to 90 parts hydraulic binder and 80 parts aggregate to 20 parts hydraulic binder. The ranges used may, for example, accommodate the differences in density between the aggregate and the hydraulic binder. In other embodiments, the ratio of the aggregate to the hydraulic binder may influence the mechanical properties of the product obtained after curing of the cementitious mixture into a hardened mass and may influence the choice of ratio of the aggregate to hydraulic binder. In yet other embodiments, the size of the aggregate may influence choice of the aggregate binder ratio. In various embodiments, the aggregate may be chosen from a set of materials, for example, that have particles ranging from about 1 micrometer to 3 centimeters in diameter size. Embodiments with aggregates that have larger proportion of particles with smaller sizes in the chosen ranges, may be comprised of lower ratios of aggregate to hydraulic binder in the defined ranges above. Embodiments with aggregates having a larger proportion of particles with larger sizes in the chosen ranges include relatively high ratios of aggregate to hydraulic binder.

Ratios of the aggregate to hydraulic binder in various exemplary embodiments may influence the amount of water required to wet and harden the cementitious mixture. Water content may be between about 3 and about 25 wt % of the cementitious mixture in some embodiments, for example. The slump of the embodiments with water content of 5 to 7 wt % of the cementitious mixture may be 0 mm. The slump of the embodiments with water content of 25 wt % of the cementitious mixture may be 15 cm.

Class C fly ash may exhibit a tan color, and masonry products made with Class C fly ash may inherit this color. Tan colors may be useful in building materials. The color, for example, may have a natural earthy appeal. Earthy colored products using fly ash may satisfy demands for use as colored products without substantial addition of coloring pigments. However, other colors may also be provided. Any suitable dye or coloring agent may be used with the present invention. Various dyes or color agents may be chosen for a variety of reasons including color, longevity, etc. For example, it may be desirable that such colors mostly stay fast during the life of the product and/or not be damaged by casual abrasion, rubbing, or mild erosion. Addition of coloring agents to the fly ash cementitious mixtures of the embodiments of the invention may enable change in color appearance. Exemplary embodiments may use, for example, pigments derived from metal oxide or hydroxides or salts such as those of the element iron, or may be derived from colored organic compounds. In some embodiments, the use of relatively small amounts of coloring pigments, about 0.25% addition by weight of the Class C fly ash in the cementitious mixture may make useful changes in color of the object. Using about 10 wt % color pigments by weight of the Class C fly ash in the cementitious mixtures of embodiments of the invention may yield deeper colors. The amount of pigment may be controlled to, for example, between about 0.25 and about 8 wt % of the Class C fly ash in the cementitious mixture so as to provide sufficient depth of color and maintain properties of the product, Colors may be achieved through the use of about 0.5% to about 6 wt % coloring pigments by weight of the Class C fly ash in the cementitious mixtures of embodiments of the invention depending on the color to provide optimal colored product that may be cost effective and provides sufficient visual appeal. Certain embodiments may provide products with monotone color surfaces while certain other embodiments provide products with multiple surface colors.

Thus, certain exemplary embodiments may include coloring agents compatible with Class C fly ash, added in amounts from about 0 to 10% by weight of the fly ash. These embodiments may provide a stable colored surface on the masonry products and building elements. The colors may be so chosen as to provide limited chemical reaction with the matrix. Color agents that may be suitable for use with Class C fly ash binder include the hydroxides and oxides of iron and may be obtained from virgin sources or recycling of iron oxides at iron and steel processing facilities.

In particular exemplary embodiments intentional mottling of surface colors may be achieved through use of mixtures of coloring agents and the use of multiple cementitious mixes. In certain embodiments it may be advantageous to color the surface of the product with a concentrated color paste capable of adhering to the masonry product or to mold a separate mix on the surface of the masonry product to provide a different texture and/or color to the surface compared to the body of the product.

In other exemplary embodiments, a fly ash masonry unit may pass the visual efflorescence test according to ASTM C67-09 *Standard Test Methods for Sampling and Testing Brick and Structural Clay Tile*. In such testing, the masonry unit is immersed in distilled water and allowed to stand for days, for example, seven days. At the end of the standing period, the masonry unit is dried and visually observed from a distance to note the presence or absence of salt deposits on the surface of the unit. A masonry unit is considered to pass the efflorescence test if there is no visual deposit observed at the end of the test described.

In particular exemplary embodiments that pass the efflorescence test, the cementitious composition comprises an efflorescence control agent comprising about 0.025 to 5% by weight of the mixture of an integral water repelling agent with about 30 wt % to about 60 wt % Octyltriethoxysilane as active ingredient. Such integral water repelling agent is commercially available, for example, from BASF (Badishe Aniline & Sodafabrik, Ludwigshafen of Germany) under the tradename Rheopel Plus. In another exemplary embodiment, the integral water repelling agent comprises an organic acid comprising about 75% to about 100% C14 to C18 organic fatty acid. The organic agent may be added from about 0.025% to about 5.0%, more preferably, from about 0.05% to about 1.0% by weight of the entire mixture. Efflorescence control in masonry products that may be composed of large amounts of Class C fly ash according to embodiments of the invention may be accomplished by embodiments that contain higher amounts of the water repelling agents, while efflorescence control in masonry products that, when used in construction, encounter water rather occasionally may be accomplished by embodiments that contain less amounts of the water repelling agents. Certain embodiments also possess efflorescence control agents comprised of a carbon containing base or a salt, for example.

In one exemplary embodiment, a fly ash masonry unit can pass 50 freeze/thaw cycles, when tested per ASTM C67-09 *Standard Test Methods for Sampling and Testing Brick and Structural Clay Tile*. In such testing, the product resists freeze-thaw damage when exposed to repeated cyclic freezing and thawing for 50 cycles, comprised of a cyclic procedure wherein the product is submerged in 1.27 cm of water and exposed to freezing at air temperatures below −9° C. for 20±1 hours per cycle of freezing and the product is thawed by complete submersion in water at a temperature of 24±5.5° C. for 4±1 hours per cycle. The masonry unit is considered to pass this freeze-thaw test if the unit does not break, crack to expose a crack length no greater than the minimum dimension, or lose more than 0.5% by weight. Prior art of Portland cement based and fly ash based masonry units teaches the need for a desired air content and distribution of air throughout the cementitious body to enable freeze-thaw resistance described here. Air content and distribution, if desired, may be obtained through the use of particular chemicals that entrain air, known commonly as air-entrainers, and commonly used in Portland cement based masonry of the prior art. However, exemplary embodiments have the ability to resist freeze-thaw without the addition of air-entrainers. Particular embodiments may be comprised of freeze-thaw durable products that can be produced at high volume of at least 6 tons per hour.

In various exemplary embodiments, methods and compositions utilise various admixtures to enhance durability of the building products produced (e.g., fly ash brick, block). Such admixtures include, but are not limited to, mineral admixtures such as Class F fly ash, unclassified fly ash, rice husk ash, silica fume, blast furnace slag, clay, calcined clay, metakaclin, zeolites, metastable inorganic oxides, ground glass, powdered inorganic oxides, or gypsum. An aspect of the invention provides combinations of admixture(s) in such ways that control of one performance characteristic must not interfere with other performance attributes, E.g. admixtures that control set characteristics, should not interfere with admixtures used to control efflorescence characteristics of the final product. Controlling mechanisms also include the nature of mixing, forming, and curing and the phases developed in the product. These all contribute to rate and ultimate strength developed in the product and so forth.

An aspect of the invention discloses that articles made with Class C fly ash as the main component of the hydraulic cement in an article can be cured by immersion in or by exposure to water vapor soon after forming. The water vapor may be obtained through misting of water at ambient temperature and pressure or even through higher temperature and pressure. It may be preferable that the temperature of water and air around the product be maintained below 100° C. so as to conserve energy and reduce greenhouse gas emission, though it may be possible to conduct the curing at elevated temperatures and pressures beyond 100° C. The time for curing of articles can be shortened to only a few minutes after which the articles may be packaged in suitable packaging that may even be water vapor resistive packaging permitting continued curing at ambient temperatures and pressures. At the same time, the aspects of the invention can also be practiced with the use of methods of curing consistent with prior art. One possible advantage of the aspects of the invention over prior art, with respect to curing of articles post-forming, and in readiness for sale and use, may be in permitting a significant reduction in the time and temperature required for curing as compared to conventional articles made with Portland cement or lime-based hydraulic cements. This aspect of the invention may permit substantial saving in energy and time of manufacture and in the related emission of gases such as carbon dioxide into the atmosphere as compared to articles manufactured by methods of prior art.

Further, the nature of the products may be such that continued reaction may be possible with gases in the atmosphere, both during curing in confined chambers and when exposed to natural atmosphere, such as oxygen, water vapor, carbon dioxide, carbon monoxide and other gaseous components of the atmosphere.

In particular exemplary embodiments, products may be finished after some extent of curing using a variety of methods to provide necessary properties. Such finishing methods in various embodiments, include but are not limited to mechanical or chemical processes, such as the product after some extent of curing may be brushed, etched with acid or alkali, washed with water, painted, coated, sealed, air cleaned, pressure washed with aqueous or non-aqueous solutions, surface textured through processes such as antiquing, texturing, scoring, cutting, shaping, crushing, rubbing, tumbling, hammering, eroding, winding or similar process of producing smooth, rough, broken, and uneven or even surfaces.

In particular exemplary embodiments, the masonry product may be designed to enable bonding of surfaces of masonry units to cementitious mortars. The cement mortar bonded units of these embodiments may be capable of maintaining the bond when exposed to tensile forces in excess of 345 kPa directed towards breaking the bond. Certain embodiments allow the forming of products that can be used with a variety of mortars, commonly referred to as M, S, N, O, and K mortars depending on the contents of lime and Portland cement in the representative mortar.

FIGS. 4-7 show a flowchart of an exemplary method 400 for making Class C fly ash for a various applications (e.g., for creating Class C fly ash based masonry products or other building materials). FIGS. 4-7 show steps 401-411 that may be used to manufacture high volumes of masonry product. Aspects of the steps 401-411 and method 400 were used to create Examples 1-15, as described in more detail in the following section. It is to be understood that the steps in FIGS. 4-7 are merely exemplary and not all the steps in FIGS. 4-7 need be performed within the context of the instant invention. Moreover, additional steps to those shown in FIGS. 4-7 may be employed within the context of the present invention. Letter designations A (FIGS. 4 and 6) and B (FIGS. 6 and 7) are meant to connect the flowchart representing method 400 between figures. They are not meant as additional steps.

Figure 4:
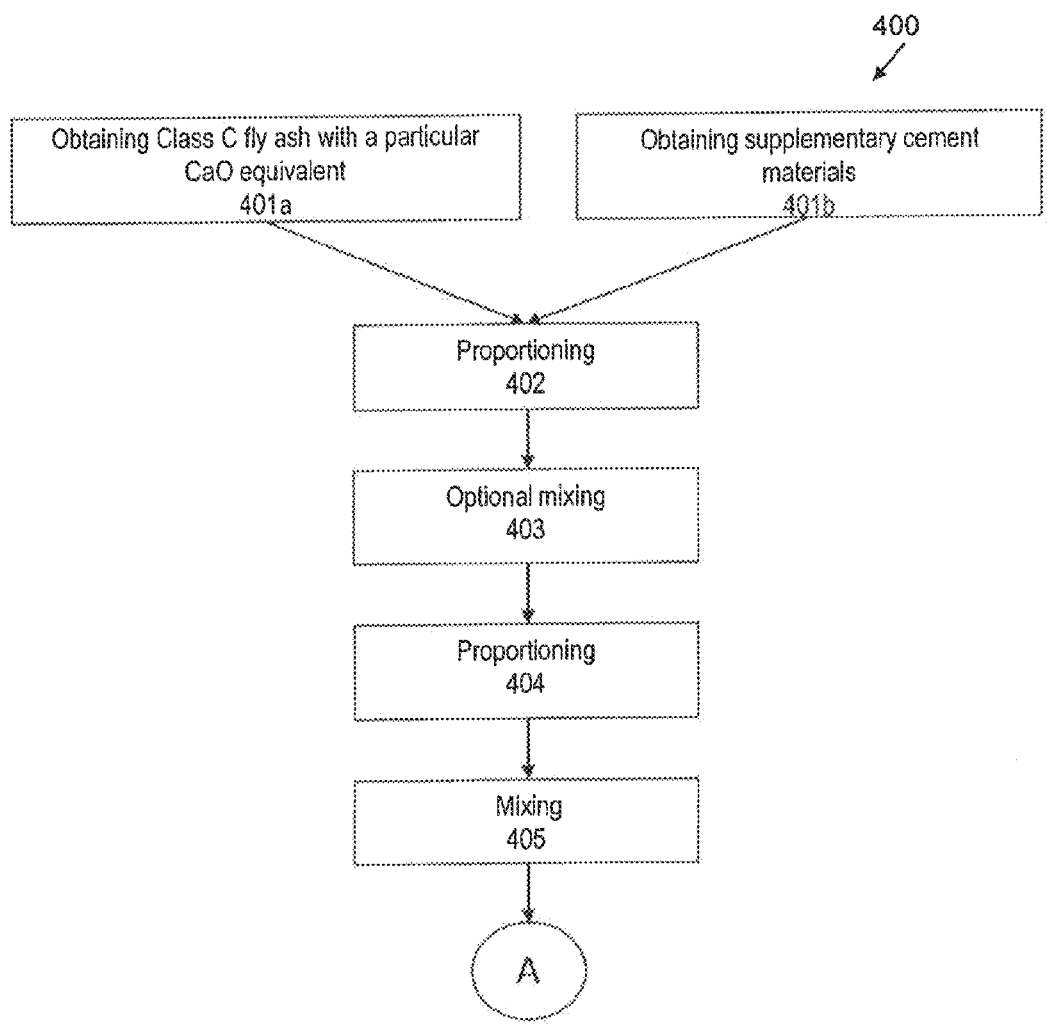
FIGS. 4-7 show a flowchart of an exemplary embodiment for making Class C fly ash for a various applications, according to aspects of the present invention.

As described in FIG. 4 an exemplary method 400 for making cementitious fly ash products according to embodiments of the instant invention may include: step (401a) selecting a fly ash with an appropriate CaO equivalent value. For example, in Example 1, as described below, a fly ash with greater than 15 wt % CaO equivalent is selected. However, it is to be understood that any suitable CaO equivalent may be selected for the application. In step (401b), for example, an appropriate amount of supplementary cement materials may also be added and proportioned appropriately. In step (402) of exemplary method 400, an amount of Class C fly ash by weight, for example, and other components may be proportioned for the particular application. In step (403) the various components of the composition may be mixed. In step (403) additional components may be added to the mix and the additional components. Step (14) may include mixing the proportioned ingredients in one or more steps in appropriate sized mixers as described in Examples 1-15.

Figure 5:
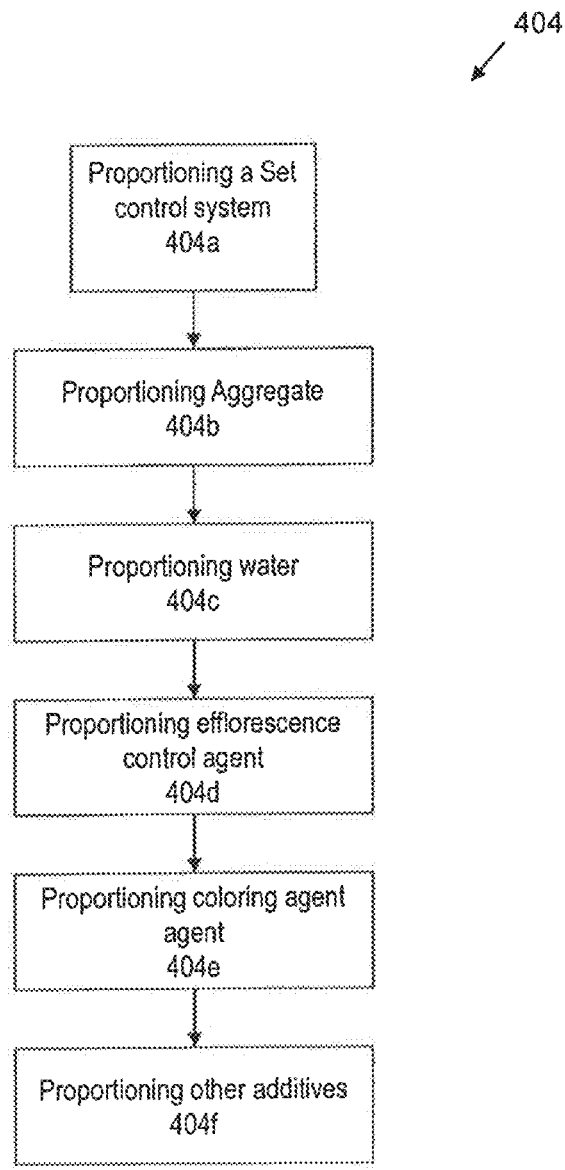

FIG. 5 shows a more detailed view of the proportioning step (404) shown in FIG. 4. It is to be understood that the proportioning steps 404a-404f shown in FIG. 5 are not necessarily followed in the order shown in FIG. 5, nor are all steps 404a-404f necessarily performed in each of the embodiments of the invention. FIG. 5 is merely illustrative of proportioning steps that may be included in the method 400. As shown in FIG. 5, the proportioning step 404 may further include a step of proportioning a set control system (step 404a). The proportioning of the set control system (step 404a) may further include, for example, selecting a boron bearing acid or salt (e.g., Examples 1 and 2). The proportioning of the set control system (step 404a) may also include selecting and proportioning a tartaric acid (e.g., as in Examples 1 and 2) and/or mixing and proportioning a boron bearing material and tartaric acid with water (e.g., Example 1). As also shown in FIG. 5 appropriate of aggregate (e.g., sand as in examples 1-15) (step 404b), water (step 404c), efflorescence control agent (step 404d, as described in Examples 3-6) and coloring agent (step 404e, as described in Example 15) may be added to the mixture and proportioned (step 404). Step 404c may include, for example, proportioning an appropriate amount of water to achieve a specific consistency in the mixture (e.g., as described in the context of Example 14, below). As shown in FIG. 5, step 404 may further include a step 404f of adding other additives including any such additives discussed herein and as well as additives not explicitly discussed herein.

Figure 6:
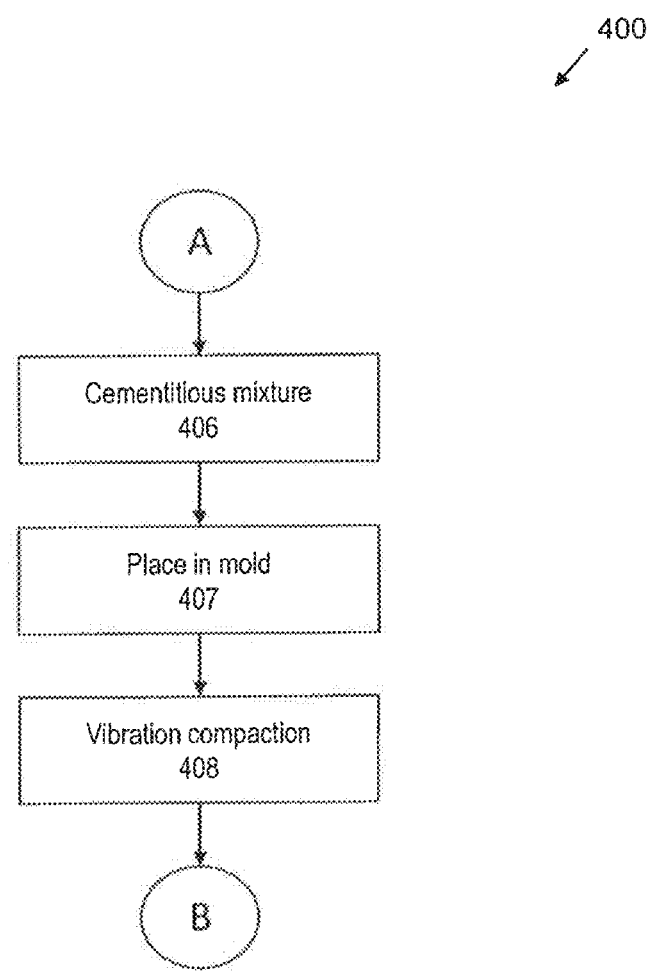

As shown in FIG. 6, in step (406), the cementitious mixture may be obtained or extracted from the mixing environment and in step (407) placed into a mold (e.g., Examples 11-13). In step (408) the material in the mold may be vibration compacted with sufficient confining pressure to contain material within the mold cavity (e.g., Examples 3-6).

Figure 7:
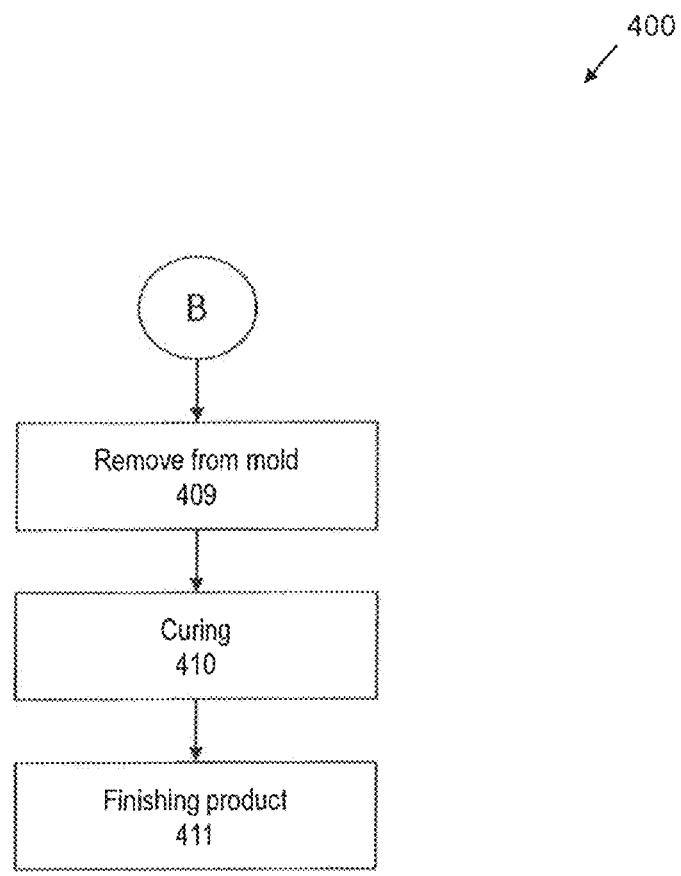

As shown in FIG. 7, in step (409), the material may be dislodged from the mold to form a compacted green product (e.g. fly ash brick) as in Example 12. In step (410), the product may be cured (e.g., Examples 11, 12, and 13). In step (411), a finished product may be extracted and used.

In the steps of method 400, optional admixtures may be also be added for any reason, including, for example, to introduce specific properties to the finished product (step 20). Examples of the specific properties include, but are not limited to: color, surface nature, durability, hardness, setting character and efflorescence control.

Examples 1-6

Table 1 lists ingredients used to create and properties measured for Examples 1-6. The chemical composition of the Class C Fly ash for Example 1 is given in Table 2. The CaO equivalent of the fly ash for Example 1 was 25.3 wt %. Aggregate in the form of sand was also weighed to the amount described in Table 1 for Examples 1-6. Each of the other ingredient amounts listed in Table 1 for Example 1 was weighed in separate containers.

Example 1 was produced as follows. The fly ash and sand were placed in the bowl of a Hobart mixer. The boric acid and tartaric acid set control system chemicals were weighed in required amounts listed in Table 1, mixed with the water, and the resulting solution was added to the sand and mixed thoroughly for 90 seconds. The fly ash was then added to the mixture and mixed for an additional 60 seconds. Immediately after mixing, the wet granular mass was removed and placed in an insulated cup. The temperature of the mix was continuously measured using a thermocouple attached to a computer. The temperature of the mixture was observed to hold steady for 41 minutes after which the temperature increased indicating commencement of reaction between the Class C ash and water.

Similar mixtures were made with the compositions listed in Table 1 for Examples 2-6. In Examples 1-6, integral water repellent, Rheopel Plus, was obtained from BASF of Germany. The time for commencement of reaction of fly ash with water was recorded for Examples 1-6, as listed in Table 1.

In Examples 1-6, cubes of each exemplary composition were obtained by placing the granular mixture of each composition, upon completion of mixing, in a cube mold with 5 centimeter side dimensions and a total volume of 125 cubic centimeters. Each mixture in the cubic mold was vibrated and compacted in less than 60 seconds on a table vibrator. The time of vibration varied between 20 and 60 seconds depending on properties of the composition. The molded cubes for each exemplary composition (hereinafter "the cubes") were then cured at 70° C. and 95 to 100% humidity in air. The cubes were then exposed to standing water by placing the cubes in separate pans of distilled water. In the pans, the distilled water was maintained to an approximate height of 2.54 centimeters from the base of the cube being tested for a period of 7 days. Subsequently, the cubes were removed and transferred to an oven for 24 hours at a temperature near 110'C. Oven exposure served to dry out the cubes. The cubes were subsequently removed from the oven, cooled under ambient conditions and visually inspected from a distance of 3.05 m to determine the apparent degree of efflorescence. The visible presence of salt and/or other material encrusted on one or more surfaces of the cube indicated the presence of efflorescence. If no salt and/or other material was observed to be encrusted on the surfaces of the cute, this was taken as an indication that there was no observable efflorescence. The results are recorded in Table 1.

As shown in Table 1, observation of Examples 3-6, indicated essentially no efflorescence. Since the compositions of Examples 3-6 include the chemicals Oleic acid and/or the Rheopel Plus containing Octyltriethoxysilane, it appears that the presence of these chemicals may provide some efflorescence resistance to the compositions in Examples Examples 7-10

Table 3 lists ingredients used to create and properties measured for Examples 7-10. In particular, for Examples 7-10 the time to commence reaction of class C fly ash and water was measured for a number of different, exemplary compositions in order to determine the influence of the set control system on this time. The time to commence reaction of class C fly ash and water was measured via change in temperature (e.g., via thermocouple), as described above. Examples 7-10 were formulated in a manner similar to that described in the context of Example 1 above.

TABLE 1

List of ingredients and measured properties for Examples 1-6.

| | Example | | | | | |
|---|---|---|---|---|---|---|
| Material | 1 Amount | 2 Amount | 3 Amount | 4 Amount | 5 Amount | 6 Amount |
| Class C fly ash | 1000 g | 1000 g | 1000 g | 1000 g | 1000 g | 1000 g |
| Aggregate, as Sand | 1550 g | 1550 g | 1520 g | 1550 g | 1550 g | 1550 g |
| Boric acid | 0.16 g | 0.0 g | 0.0 g | 0.0 g | 0.0 g | 0.0 g |
| Sodium tetraborate decahydrate | 0.0 g | 1.0 g | 1.1 g | 0.5 g | 1.5 g | 0.5 g |
| Tartaric acid, L+ dextro form | 1.00 g | 1.0 g | 1.1 g | 1.5 g | 0.5 g | 1.5 g |
| Oleic acid | 0.0 g | 0.0 g | 0.5 g | 0.0 g | 0.0 g | 0.0 g |
| Rheopel Plus | 0.0 g | 0.0 g | 0.0 g | 5.0 g | 5.0 g | 50.0 g |
| Water | 144.5 g | 122.1 g | 118.3 g | 122.1 g | 122.1 g | 119.6 g |
| Time to commence reaction of Class C fly ash and water | 41 minutes | 46 minutes | 56 minutes | 122 minutes | 33 minutes | 62 minutes |
| Observation of efflorescence | Effloresced | Effloresced | None observed | None observed | None observed | None observed |

TABLE 2

Chemical composition of Class C fly ash used in Example 1 of Table 1.

| Material | Amount, wt % |
|---|---|
| $SiO_2$ | 34.78 |
| CaO | 25.30 |
| $Al_2O_3$ | 18.39 |
| $Fe_2O_3$ | 6.09 |
| MgO | 6.47 |
| $Na_2O$ | 2.23 |
| $SO_3$ | 1.56 |
| $P_2O_5$ | 1.46 |
| $TiO_2$ | 1.32 |
| $K_2O$ | 0.55 |
| SrO | 0.39 |
| BaO | 0.78 |
| ZnO | 0.02 |
| LOI | 0.66 |
| Total | 100 |

TABLE 3

List of ingredients and measured properties for Examples 7-10.

| Example | 7 | 8 | 9 | 10 |
|---|---|---|---|---|
| Material | Amount | Amount | Amount | Amount |
| Class C fly ash | 1000 g | 1000 g | 1000 g | 1000 g |
| Sand | 3001 g | 2340 g | 1860 g | 1500 g |
| Sodium tetraborate decahydrate | 1 g | 1 g | 1 g | 1 g |
| Tartaric Acid (L+) | 1 g | 1 g | 1 g | 1 g |
| Rheopel Plus | 2 g | 2 g | 2 g | 2 g |
| Water | 225.10 g | 183.70 g | 154.00 g | 131.80 g |
| Time to commence reaction of Class C fly ash and water | 16 minutes | 22 minutes | 25 minutes | 37 minutes |

As shown in Table 3, varying the ratio of Class C fly ash to sand in Examples 7-10 changes the time to commence reaction of class C fly ash and water. More specifically, Examples 7-10 show that the time for commencement of the reaction of Class C fly ash with water increases as the ratio of Class C fly ash-to-sand increases for the same amount of the set control system addition, Examples 7-10 show that decreasing the proportion of sand in the mixture from Example 7 to Example 10 by around 50% is related to an increase in the time to commence reaction of class C fly ash and water of approximately 130%.

Example 11

Table 4 lists ingredients used to create and properties measured for Example 11. In particular, for Examples 11 the compressive strength of a cube of the exemplary composition was measured after the cube had been aged for 9 days age. In Example 11, a Class C fly ash was used to form products with a Class F fly ash as a supplementary cementing material to form the hydraulic binder. The ratio of Class C to Class F fly ash in the mixture was 90 parts Class C fly ash to 10 parts Class F fly ash by weight.

TABLE 4

List of ingredients and measured properties for Example 11.

| Material | Amount |
| --- | --- |
| Class C fly ash | 900.0 g |
| Class F fly ash | 100.0 g |
| Sand | 1540.0 g |
| Sodium tetraborate decahydrate | 1.1 g |
| Tartaric acid | 1.1 g |
| Water | 145.0 g |
| Compressive strength of cube at 9 days age | 66.4 MPa |

Cubes of the exemplary composition of Example 11 were produced as follows. The ingredients in Example 11 were first weighed in separate containers. The Class C and Class F fly ash and sand were then placed in the bowl of a Hobart mixer. The set control system (e.g., sodium tetraborate decahydrate and tartaric acid set control system chemicals) was then mixed with water and added to the fly ash and sand. The same order of addition of other components as described in the context of Example 1 above was used for like components in Example 11. Shortly after mixing for 3 minutes, the wet granular mass was removed, placed into brass molds and vibrated and compacted in the molds. The result produced cubes of material. A small portion of the mix separate from the cubes was then placed in an insulated cup and the temperature of the mix was continuously measured using a thermocouple attached to a computer. The temperature of the mixture was observed to hold steady for 104 minutes, after which the temperature increased. The temperature increase was taken as indicating commencement of reaction between the fly ash and water. The cubes were then cured at 70° C. and 85-95% RH for 8 hours and had a compressive strength of 66.4 MPa at 9 days age from the time of mixing the Class C fly ash with water.

Example 12

Table 5 lists ingredients used to create and properties measured for Example 12. In particular, for Example 12 average time to commence reaction of Class C fly ash with water and compressive strength were measured and attempts were made to observe efflorescence according to similar testing procedures described in the context of Examples 1-11 above.

TABLE 5

List of ingredients and measured properties for Example 12.

| Material | Amount |
| --- | --- |
| As-received Class C fly ash | 250 kg |
| As-received Sand | 780 kg |
| Sodium tetraberate decahydrate | 0.25 kg |
| Tartaric acid | 0.25 kg |
| Integral water repellent | 0.5 kg |
| Water | 30 kg |
| Average time to commence reaction of Class C fly ash and water | 15 minutes |
| Compressive strength at 16 days age | 54.6 MPa |
| Observation of efflorescence | No efflorescence observed |

Class C fly ash and sand for Example 12 were obtained in bulk. Prior to the addition of water, these materials were weighed and added to a mechanical mixer of sufficient size. The set control system chemicals (e.g., sodium tetraborate decahydrate and tartaric acid) were then mixed in with about 10% of the water amount listed in Table 5. The resulting solution was added to the fly ash and sand. Rheopel Plus (obtained from BASF of Germany) and the remaining 90% of the water were then added and mixed for approximately 300 seconds. Subsequently, the materials were discharged to a vibration-compaction machine, similar to those used to produce concrete masonry units. The vibration-compaction machine was capable of forming 30 paver masonry units per run with a nominal size of 200×100×60 mm. The entire 1061 kg mixture was formed into masonry units in approximately 300 seconds. The entire process was then repeated approximately every 8 minutes to provide a throughput of 7.5 tons of product per hour.

The average time for commencement of the reaction between the added water and the Class C fly ash in the various mixes was measured by temperature evolution history of the wetted mixtures. As shown in Table 5, the average time for commencement of the reaction was 15 minutes. The product produced by the method described above was cured in a closed chamber with water misting at a temperature below 90° C. As shown in Table 5, he measured compressive strength of the product was 54.6 MPa at 16 days after forming and no efflorescence was observed when tested according to ASTM 067.

Example 13

Table 6 lists ingredients used to create and properties measured for Example 13. In particular, for Example 13 compressive strength was measured according to similar testing procedures described in the context of Examples 1-11 above. In addition, freeze-thaw performance was measured, as described below.

TABLE 6

List of ingredients and measured properties for Example 13.

| Material | Amount |
| --- | --- |
| Class C fly ash | 45.00 kg |
| Sand | 69.53 kg |
| Sodium tetraborate decahydrate | 0.045 kg |
| Tartaric Acid | 0.045 kg |
| Integral water repellent | 0.16 kg |
| Water | 5.08 kg |
| Compressive strength at 9 days age | 55.5 MPa |
| Freeze-thaw performance | Passes requirement of ASTM C216 when tested per ASTM C67 |

Class C fly ash and sand in Example 13 were first weighed in separate containers. The set control system chemicals (e.g., sodium tetraborate decahydrate and tartaric acid) were mixed with about 20% of the water. The resulting solution, remaining water, integral water repellent, and sand were then mixed together for 45 seconds in a mechanical mixer. Subsequently, Class C fly ash was added to the mixture and mixed for an additional 60 seconds. The resulting material was discharged into a vibration-compaction machine, similar to those used to produce concrete masonry units. Pavers with nominal dimensions of 200×100×60 mm were produced and cured at 30-70° C. and 70-100% RH for 16-18 hours. As shown in Table 6, the resulting product had a compressive strength of 55.5 MPa at 9 days and met the freeze-thaw requirements of ASTM C67.

Example 14

Table 7 lists ingredients used to create and properties measured for Example 14. In particular, for Example 14 slump was measured, as described below.

TABLE 7

List of ingredients and measured properties for Example 14.

| Material | Amount |
| --- | --- |
| Class C fly ash | 45.00 kg |
| Sand | 67.50 kg |
| Sodium tetraborate decahydrate | 0.05 kg |
| Tartaric acid | 0.05 kg |
| Integral water repellent | 0.14 kg |
| Water | 6.60 kg |
| Slump | 0 mm |

In Example 14, the set control system chemicals (e.g., sodium tetraborate decahydrate and tartaric acid) were first mixed with about 17% of the water. The resulting solution was added to the sand, integral water repellent, and the remaining water in a mechanical mixer and mixed for 45 seconds. Subsequently, Class C fly ash was added to the mixer and mixed in for an additional 60 seconds. Subsequently, the granular mix was discharged from the mixer and the slump measured according to techniques described above. The slump of the mix was determined to be 0 mm according to the method described in ASTM C143.

Example 15

Table 8 lists ingredients used to create and properties measured for Example 15. In particular, for Example 15 color was measured, as described below.

TABLE 8

List of ingredients and measured properties for Example 14.

| Material | Amount |
| --- | --- |
| Class C fly ash | 1000 g |
| Sand | 1550 g |
| Sodium tetraborate decahydrate | 1.1 g |
| Tartaric acid | 1.1 g |
| Red Color Pigment | 60 g |
| Water | 122 g |
| Final color of all surfaces of cured product | Red |

In Example 15, the set control system chemicals (e.g., sodium tetraborate decahydrate and tartaric acid) were first mixed with about 17% of the water. The resulting solution was added to the sand, integral water repellent, and the remaining water in a mechanical mixer and mixed for 45 seconds. Subsequently, Class C fly ash was added to the mixer and mixed in for an additional 60 seconds. Subsequently, the granular mix was discharged from the mixer.

In Example 15, the composition was formed into cubes in a manner similar that described in the context of Example 3 above. As shown in Table 8, iron oxide red color pigment was added. The cured cubes were visually inspected to determine color. All the surfaces were determined to be red in color.

Exemplary embodiments provide cementitious products in shapes that are suitable for construction applications. Various exemplary embodiments have been demonstrated to provide materials that may be capable of meeting various specifications of masonry units when tested per relevant ASTM standard methods. Examples of such conformance include but are not limited to, freeze-thaw resistance when tested with water, freeze-thaw resistance when tested with saline solutions, efflorescence behavior, compressive strength, bond strengths with mortars, shrinkage for masonry, skid resistance, abrasion resistance, dimensional tolerance and distortion tolerance of shapes. Particular embodiments provide hardened and cured products that may be capable of withstanding compressive forces of at least 20.7 MPa. In yet other embodiments, cured products may be capable of withstanding compressive loads in excess of 55.2 MPa. These and other attributes of the exemplary embodiments allow the use of the resulting products in applications as a brick, a block, a paver, a segmented retaining wall block, a pipe, a rooting tile, a panel, or an architectural element.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the aspects of the invention. It is intended that the following claims define the scope of the invention and that methods and structures within the scope of these claims and their equivalents be covered thereby.

What is claimed is:

1. A freeze-thaw durable cementitious product including at least 20 wt % of post-industrial recycled material, the product comprising:
  a hydraulic binder including at least 75% by weight of Class C fly ash one or more aggregates comprising between 10 and 80% by weight of the cementitious product;
  boron comprising at least 0.0015% by weight of the cementitious product; and
  salt of tartartic acid comprising a tartaric acid content of at least 0.013% by weight of the cementitious product;
  wherein the cementious product includes a shape suitable for construction and exhibits a compressive load bearing ability of at least 20.7 MPa.

2. The product of claim 1, wherein the product resists freeze-thaw damage when exposed to repeated cyclic freezing and thawing comprising a cyclic procedure wherein the product is submerged in 1.27 cm of water and exposed to freezing at air temperatures below −9° C. for 20±1 hours per cycle of freezing and the product is thawed by complete submersion in water at a temperature of 24±5.5° C. for 4±1 hours per cycle.

3. The product of claim 2, wherein the product cracks no greater than the minimum dimension of the product when exposed to 50 cycles of freezing and thawing.

4. The product of claim 2, wherein the product remains in one piece when exposed to 50 cycles of freezing and thawing.

5. The product of claim 2, wherein the product loses less than 0.5% by weight of its mass when exposed to 50 cycles of freezing and thawing.

6. The product of claim 1, comprising a density between 0.50 and 0.98 times a theoretical density.

7. The product of claim 1, one or more aggregates include at least one of silica sand, limestone, granite, dolerite, basalt, sandstone, dolomite, quartz, recycled concrete, recycled foundry sand, recycled glass, recycled minerals, or mine spoils and include particle sizes ranging from about one micrometer to about 3 centimeters.

8. The product of claim 1, further comprising an efflorescence control agent including at least one of an integral water repellent, an organic acid, a carbon containing base, or a salt.

9. The product of claim 8, wherein the efflorescence control agent includes an integral water repellent, and the integral water repellent accounts for about 0.025 wt % to about 5.0 wt % of fly ash in the cementitious mixture and comprises at least one of Octyltriethoxysilane or a C14 to C18 organic fatty acid.

10. The product of claim 1, wherein the shape includes a brick, a block, a paver, a segmented retaining wall block, a pipe, a roofing tile, a panel, or an architectural element.

11. The product of claim 1, further comprising surfaces with monotone and multiple colors.

12. The product of claim 11, comprising coloring agents including at least one of a pigment derived from a metal oxide, hydroxides or salts, or a colored organic compound.

13. The product of claim 1, wherein the product has at least one antiqued, textured, scored, cut, shaped, crushed or ground surface.

14. The product of claim 1, wherein the product having at least one surface configured to provide a bond with N and S type cementious mortars, wherein the bond exhibits a tensile strength of at least 345 kPa.

* * * * *

UNITED STATES PATENT AND TRADEMARK OFFICE
CERTIFICATE OF CORRECTION

| | | |
|---|---|---|
| PATENT NO. | : 8,747,549 B1 | Page 1 of 1 |
| APPLICATION NO. | : 14/087809 | |
| DATED | : June 10, 2014 | |
| INVENTOR(S) | : Kyle Scott Douglas et al. | |

It is certified that error appears in the above-identified patent and that said Letters Patent is hereby corrected as shown below:

On the Title Page, Item (73), in the Assignee, line 1, "Calstar" should read --CalStar--.

In the Claims

In claim 1, column 20, line 47, after "fly ash", insert --;--, and insert a line break after the ";" and before "one or more aggregates".

In claim 1, column 20, line 52, "salt of tartartic acid" should read --salt of tartaric acid--.

In claim 1, column 20, line 54, "cementious" should read --cementitious--.

In claim 7, column 21, line 8, "claim 1, one or more" should read --claim 1, wherein one or more--.

In claim 14, column 22, line 17, "cementious" should read --cementitious--.

Signed and Sealed this
Twenty-ninth Day of September, 2015

Michelle K. Lee
*Director of the United States Patent and Trademark Office*